United States Patent
McLeod et al.

(10) Patent No.: US 8,026,305 B2
(45) Date of Patent: Sep. 27, 2011

(54) ARTICLES FORMED FROM NUCLEATED POLYETHYLENE

(75) Inventors: Michael McLeod, Kemah, TX (US); John Ashbaugh, Houston, TX (US); Cyril Chevillard, Dickinson, TX (US); Gerhard Guenther, Kemah, TX (US); Ruby L. Curtis, League City, TX (US); Jay Nguyen, Pasadena, TX (US); Juan Aguirre, League City, TX (US); Raleigh McBride, Deer Park, TX (US); Ben Hicks, Shoreacres, TX (US)

(73) Assignee: Fina Technology Inc, Houston, TX (US)

( * ) Notice: Subject to any disclaimer, the term of this patent is extended or adjusted under 35 U.S.C. 154(b) by 0 days.

(21) Appl. No.: 12/243,315

(22) Filed: Oct. 1, 2008

(65) Prior Publication Data
US 2010/0081767 A1    Apr. 1, 2010

(51) Int. Cl.
*C08K 5/04* (2006.01)
*C08K 5/09* (2006.01)
*C08L 23/06* (2006.01)

(52) U.S. Cl. ........ 524/396; 524/388; 524/394; 524/436; 524/570; 524/585; 525/240

(58) Field of Classification Search .................. 524/294, 524/1, 80, 388, 394, 396, 399, 400, 436, 524/543, 570, 585; 525/191, 240
See application file for complete search history.

(56) References Cited

U.S. PATENT DOCUMENTS

| | | | |
|---|---|---|---|
| 5,674,630 A | 10/1997 | Chatterjee | |
| 5,837,177 A | 11/1998 | DiNardo | |
| 5,948,839 A | 9/1999 | Chatterjee | |
| 6,168,826 B1 | 1/2001 | Su et al. | 427/173 |
| 6,358,450 B1 | 3/2002 | Sun | |
| 6,465,551 B1 * | 10/2002 | Zhao et al. | 524/284 |
| 6,534,574 B1 * | 3/2003 | Zhao et al. | 524/284 |
| 6,733,719 B2 | 5/2004 | DiNardo | |
| 6,777,520 B2 * | 8/2004 | McLeod et al. | 526/348.1 |
| 2007/0066733 A1 | 3/2007 | Hanssen | |
| 2007/0213439 A1 * | 9/2007 | Wolters et al. | 524/321 |
| 2008/0118692 A1 * | 5/2008 | McLeod et al. | 428/36.92 |
| 2008/0227900 A1 * | 9/2008 | Borke et al. | 524/388 |

OTHER PUBLICATIONS

Sherman, Lilli M. Plastics Technology Available online at http://www.ptonline.com/articles/200607fa1.html on Jul. 20, 2006.*

* cited by examiner

*Primary Examiner* — Irina S Zemel
*Assistant Examiner* — Jeffrey Lenihan

(57) ABSTRACT

Polymer articles and processes of forming the same are described herein. The processes generally include providing an ethylene based polymer, blending the ethylene based polymer with a modifier to form modified polyethylene and forming the modified polyethylene into a polymer article, wherein the polymer article exhibits a haze that is at least about 10% less than a polymer article prepared with a similarly modified polyethylene.

20 Claims, No Drawings

ARTICLES FORMED FROM NUCLEATED POLYETHYLENE

FIELD

Embodiments of the present invention generally relate to articles formed with polyethylene. In particular, embodiments of the present invention generally relate to articles formed with nucleated polyethylene.

BACKGROUND

Due, at least in part, to polypropylene's crystallization rate, propylene polymers have been nucleated in a variety of applications, such as injection molding, rotomolding, blown film and solid state stretching processes, for example, with demonstrated improvements in processing and the resulting article's properties. For example, solid state stretched articles formed with nucleated propylene polymers may exhibit increased tenacity, reduced shrinkage and increased transparency.

However, nucleated ethylene polymers have been difficult to stretch with solid state stretching process due, at least in part, to polyethylene's high initial crystal growth rate, which may result in the nucleated ethylene polymer's inability to maintain stretchability. Prior attempts to nucleate polyethylene have therefore been focused on the utilization of specific nucleators in combination with linear low density polyethylene. While success (as measured by increasing crystallization rates) has been achieved with linear low density polyethylene, the ability to nucleate other polyethylenes, such as medium and high density polyethylene have not been demonstrated.

Therefore, a need exists to develop polymers and processes exhibiting improved properties.

SUMMARY

Embodiments of the present invention include processes of forming a polymer article. The processes generally include providing an ethylene based polymer, blending the ethylene based polymer with a modifier to form modified polyethylene and forming the modified polyethylene into a polymer article, wherein the polymer article exhibits a haze that is at least about 10% less than a polymer article prepared with a similarly modified polyethylene.

Embodiments further include polymer articles formed from the processes.

In one or more embodiments, the ethylene based polymer exhibits a density of from about 0.926 g/cc to about 0.97 g/cc and a molecular weight distribution of from about 1.5 to about 7.

In one or more embodiments, the modifier is a nucleator.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

Embodiments of the invention relate to blending ethylene based polymers with a modifier to form modified polyethylene and forming the modified polyethylene into a polymer article. Such embodiments result in unexpected improvements in properties and processing, which are demonstrated herein.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

One or more embodiments of the invention include Ziegler-Natta catalyst systems generally formed by contacting an alkyl magnesium compound with an alcohol to form a magnesium dialkoxide compound and then contacting the magnesium dialkoxide compound with successively stronger chlorinating agents. (See, U.S. Pat. No. 6,734,134 and U.S. Pat. No. 6,174,971, which are incorporated herein by reference.)

Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

One or more embodiments of the invention include metallocene catalyst systems including indenyl ligands. For example, the metallocene catalyst systems may include tetra hydro indenyl ligands.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example.

Upon removal from the reactor, the polymer may be passed to a polymer recovery system for further processing, such as addition of additives and/or extrusion, for example. In particular, embodiments of the invention include blending the polymer with a modifier (i.e., "modification"), which may occur in the polymer recovery system or in another manner known to one skilled in the art. As used herein, the term "modifier" refers to an additive that effectively accelerates phase change from liquid polymer to semi-crystalline polymer (measured by crystallization rates) and may include commercially available nucleators, clarifiers and combinations thereof.

The nucleators may include any nucleator known to one skilled in the art for modifying olefin based polymers. For example, non-limiting examples of nucleators may include carboxylic acid salts, including sodium benzoate, talc, phosphates, metallic-silicate hydrates, organic derivatives of dibenzylidene sorbitol, sorbitol acetals, organophosphate salts and combinations thereof. In one embodiment, the nucleators are selected from AMFINE® Na-11 and Na-21, commercially available from Amfine Chemical and HYPERFORM® HPN-68 and MILLAD® 3988, commercially available from Milliken Chemical. In one specific embodiment, the modifier includes HPN-20E, commercially available from Milliken Chemical.

The modifier is blended with the polymer in a concentration sufficient to accelerate the phase change of the polymer. In one or more embodiments, the modifier may be used in concentrations of from about 5 to about 3000 ppm, or from about 50 ppm to about 1500 ppm or from about 100 ppm to about 1000 ppm by weight of the polymer, for example.

The modifier may be blended with the polymer in any manner known to one skilled in the art. For example, one or more embodiments of the invention include melt blending the ethylene based polymer with the modifier.

It is contemplated that the modifier may be formed into a "masterbatch" (e.g. combined with a concentration of masterbatch polymer, either the same or different from the polymer described above) prior to blending with the polymer.

Alternatively, it is contemplated that the modifier may be blended "neat" (e.g., without combination with another chemical) with the polymer.

Polymer Product

The polymers (and blends thereof) formed via the processes described herein may include, but are not limited to, linear low density polyethylene, elastomers, plastomers, high density polyethylenes, low density polyethylenes and medium density polyethylenes, for example.

In one or more embodiments, the polymers are ethylene based. As used herein, the term "ethylene based" refers to a polymer having at least about 80 wt. %, or at least about 85 wt. %, or at least about 90 wt. % polyethylene, or at least about 95 wt. % polyethylene or at least about 98 wt. % polyethylene.

Unless otherwise designated herein, all testing methods are the current methods at the time of filing.

The ethylene based polymers may have a density (as measured by ASTM D-792) of from about 0.86 g/cc to about 0.97 g/cc, or from about 0.88 g/cc to about 0.965 g/cc, or from about 0.90 g/cc to about 0.965 g/cc or from about 0.925 g/cc to about 0.97 g/cc, for example.

In one or more embodiments, the polymers are medium density polyethylene. As used herein, the term "medium density polyethylene" refers to ethylene based polymers having a density of from about 0.92 g/cc to about 0.94 g/cc or from about 0.926 g/cc to about 0.94 g/cc. In another embodiment, the polymers are high density polyethylene. As used herein, the term "high density polyethylene" refers to ethylene based polymers having a density of from about 0.94 g/cc to about 0.97 g/cc.

The ethylene based polymers may have a narrow molecular weight distribution. As used herein, the term "narrow molecular weight distribution" refers to a polymer having a molecular weight distribution ($M_w/M_n$) of from about 1.5 to about 8, or from about 2.0 to about 7.5 or from about 2.0 to about 7.0, for example.

The ethylene based polymers may have a melt index ($MI_2$) (as measured by ASTM D1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, for example.

One or more embodiments include ethylene based polymers are formed from single site transition metal catalyst systems. In one embodiment, the transition metal catalyst systems include metallocene catalyst systems (hereinafter referred to as metallocene polyethylene). For example, the metallocene polyethylene may include Finacene® m3410 or Finacene® m2710, commercially available from TOTAL PETROCHEMICALS, USA, Inc.

In one or more embodiments, the metallocene ethylene based polymers may have a molecular weight distribution of from about 1.5 to about 4.5 or from about 2.0 to about 4.0, for example.

One or more embodiments include ethylene based polymers formed from Ziegler-Natta catalyst system (hereinafter referred to Z-N polyethylene). For example, the Z-N polyethylene may include Finathene® 6410 or Finathene® 6420, commercially available from TOTAL PETROCHEMICALS, USA, Inc.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

One or more embodiments of the invention include utilizing the polymers in solid state stretching applications, such as thermoforming, drawn tape, drawn monofilament, mono direction oriented film, biaxially oriented film, solid state extrusion and injection stretch blow molding, for example.

Other embodiments of the invention include utilizing the polymers in melt formed films, such as blown films and cast films. Blown films may be formed by forcing molten polymer through a circular die, which is then blown. The resultant bubble is then flattened and cut into strips, that when rolled, produces rolls of flat film. In contrast, cast films may be formed by passing molten polymer through an extruder, forcing the resultant thin layer over a chill roll to form a cool roll. The resulting cool roll is then cut and rolled into the cast film.

However, nucleated ethylene polymers have been difficult to stretch with solid state stretching process due, at least in part, to polyethylene's high initial crystal growth rate, which may result in the nucleated ethylene polymer's inability to maintain stretchability. Prior attempts to nucleate polyethylene have therefore been focused on the utilization of specific nucleators in combination with linear low density polyethylene. While success (as measured by increasing crystallization rates) has been achieved with linear low density polyethylene, the ability to nucleate other polyethylenes, such as medium and high density polyethylene have not been demonstrated.

Embodiments of the invention have been shown to unexpectedly improve properties, including clarity, without significant deterioration in other properties, such as toughness, for example. One or more embodiments resulted in a reduction of haze (as measured by ASTM D 1003) in the formed article of at least about 10%, or at least about 15%, or at least about 20%, or at least about 25%, or at least about 30%, or at least about 35%, or at least about 40%, or at least about 45% or at least about 50% over an article formed by an identical process and polymer absent modification, for example. One or more embodiments resulted in an increase in 45° gloss (as measured by ASTM D 2457) in the formed article of at least about 20%, or at least about 25%, or at least about 30%, or at least about 40%, or at least about 50% or at least about 60% over an article formed by an identical process and polymer absent modification, for example. One or more embodiments resulted in a decrease in the water vapor transmission rate (as measured by ASTM F1249) in the formed article of at least about 15%, or at least about 20%, or at least about 25%, or at least about 30%, or at least about 35% or at least about 40% over an article formed by an identical process and polymer absent modification, for example.

In addition, embodiments of the invention have been shown to unexpectedly improve properties in comparison with similarly modified polyethylene. As used herein, the term "similarly modified polyethylene" refers to modified polyethylene (polyethylene blended with the modifier, as described above) that does not meet the requirements defined herein. For example, "similarly modified polyethylene"

refers to modified polyethylene that does not result in articles having the improvements described above. Specifically, "similarly modified polyethylene" refers to modified polyethylene that does not result in formed articles having a reduction in haze of at least about 10%.

One or more embodiments resulted haze reduction in the formed article of at least about 5%, or at least about 8%, or at least about 10% or at least about 12% over similarly modified polyethylene, for example. One or more embodiments resulted in gloss increase in the formed article of at least about 10%, or at least about 15%, or at least about 20%, or at least about 25%, or at least about 30% or at least about 40% over similarly modified polyethylene, for example. One or more embodiments resulted in a decrease in the water vapor transmission rate in the formed article of at least about 5%, or at least about 10%, or at least about 15%, or at least about 20% or at least about 25% over similarly modified polyethylene, for example.

In addition, embodiments of the invention provide for improved control of the coefficient of friction (COF) during film processing. For example, prior efforts for COF control included corona treatment of films, which often resulted in slip migration of additives.

However, it has been observed that blending the modifier and the polymers described herein results in increased control over the COF. For example, one or more embodiments of the invention have provided to ability to control the COF within a range of from about 0.3 to about 0.5, for example.

In one specific embodiment, the polymers described above are utilized to form blown films. The blown films unexpectedly exhibit superior optical properties (as demonstrated by improvements in haze and gloss) not exhibited by blown films formed with comparison barrier grade polyethylenes, both of which were nucleated.

In one specific embodiment, the polymers are utilized to form cast films. While improvements were observed with the blown film embodiments described above, success in blown film does not ensure success with cast film. For example, the rapid quenching utilized in cast film, may render modifiers ineffective.

However, embodiments of the invention, and in particular, the polymers described herein, have demonstrated improvements in cast film properties, such as increased clarity (decreased haze, increased gloss, more uniform gloss), reduced shrinkage and decreased permeability, for example. It has further been observed that the cast films experience improved heat seal and hot tack characteristics and decreased permeability in comparison with similarly nucleated polyethylene.

In one specific embodiment, the polymers are utilized to form blow molded articles.

It has been observed that blow molded articles formed by the embodiments described herein exhibit increased clarity gloss, barrier and cycle times (as evidenced by the decrease in recrystallization temperature).

EXAMPLES

Example 1

Blown films were formed from varying polymer samples. Sample 1A was formed from M3410EP (a metallocene formed polyethylene having a density of 0.934 g/cc and an $MI_2$ of 0:9 dg/min), commercially available from TOTAL PETROCHEMICALS, USA, Inc. Sample 1B was formed by melt blending Sample 1A with 1000 ppm of HPN-20E, a nucleator commercially available from Milliken Chemicals. Sample 1C was formed from 6420 (a Ziegler-Natta formed polyethylene having a density of 0.962 g/cc and an $MI_2$ of 2.0 dg/min.), commercially available from TOTAL PETROCHEMICALS USA, Inc. Sample 1D was formed by melt blending Sample 1C with 1000 ppm of HPN-20E.

The samples were compounded and blown films produced. The blown film properties were determined and are listed in Table 1 below.

TABLE 1

| Sample | Film thickness (mil.) | Haze (%) | Gloss @45° | Secant Modulus (kpsi) | WVTR (g/in²/day) | OTR (cc/in²/day) |
|---|---|---|---|---|---|---|
| 1A | 1.0 | 10 | 55 | 52 | 0.85 | 410 |
| 1A | 2.0 | NR | NR | NR | 0.336 | 163 |
| 1B | 1.0 | 6 | 63 | 71 | 0.62 | 270 |
| 1B | 2.0 | NR | NR | NR | 0.230 | 109 |
| 1C | 2.0 | NR | NR | NR | 0.152 | 93 |
| 1D | 2.0 | NR | NR | NR | 0.099 | 48 |

*NR means not recorded

A significant decrease in the water vapor transmission rate, oxygen transmission rate and haze were observed. An increase in the gloss was observed. Little change was observed in the film's mechanical properties.

In addition, it was observed that a significant reduction in water vapor transmission rate (WVTR) was possible (at least 20%) with medium density polyethylene as well as high density polyethylene.

Example 2

Blown films were formed from varying polymer samples. Sample 2A was formed by blending 70 wt. % nucleated (1000 ppm HPN-20E) M3410 with 30 wt. % 6420. Sample 2B was formed by blending 70 wt. % nucleated (1000 ppm HPN-20E) 6420 with 30 wt. % M3410. Sample 2C was formed by blending 70 wt. % M3410 with 30 wt. % nucleated (1000 ppm HPN-20E) 6420. Sample 2D was formed by blending 70 wt. % 6420 with 30 wt. % nucleated (1000 ppm HPN-20E) M3410.

The samples were compounded and 2 mil blown films produced. The blown film properties were determined and are listed in Table 2 below.

TABLE 2

| Sample | WVTR (g/in²/day) | OTR (cc/in²/day) |
|---|---|---|
| 1A | 0.336 | 0.152 |
| 1C | 163 | 93 |
| 1D (2000 ppm nucleator) | 0.099 | 48 |
| Predicted 2C | 0.265 | 129 |
| Experimental 2C | 0.201 | 87 |
| 1B (1500 ppm nucleator) | 0.230 | 109 |
| Predicted 2A | 0.207 | 129 |
| Experimental 2A | 0.154 | 74 |
| Predicted 2B | 0.170 | 82 |
| Experimental 2B | 0.097 | 52 |
| Predicted 2D | 0.175 | 82 |
| Experimental 2D | 0.168 | 61 |

Unexpectedly, lower water vapor transmission rates and oxygen transmission rates were observed than would be predicted based on the mixture percentage. Therefore, it was observed that blending the beneficial polymers with one another, in combination with nucleator resulted in exponential improvements in properties.

Example 3

Cast films were formed from varying polymer samples. Sample 3A was formed from M3410EP. Sample 3B was formed by melt blending Sample 3A with 1000 ppm of HPN-20E. Sample 3C was formed from a metallocene formed polyethylene ($MI_2$ 3.6 dg/min., $T_m$ 125.6° C. and estimated density of 0.943 g/cc). Sample 3D was formed by blending Sample 3C with a masterbatch to form a polyethylene having 2000 ppm HPN-20E. The masterbatch was formed by combining Sample 3A with 4 wt. % of HPN-20E.

Samples 3A and 3B were cast to form 16 mil. sheets and Samples 3C and 3D were cast to form 2 mil. sheets, which were then evaluated for an improvement in properties, which are listed in Table 3A below.

TABLE 3A

| Sample # | Haze (%) | Clarity | Gloss @°45 | Outside Gloss | Inside Gloss | Transmittance |
|---|---|---|---|---|---|---|
| 3A | 51.0 | 98.1 | NR | 59.4 | 53.9 | 88.0 |
| 3B | 27.6 | 93.9 | NR | 66.8 | 66.9 | 87.3 |
| 3C | 32.1 | 92.3 | 45.9 | NR | NR | 91.3 |
| 3D | 6.67 | 99.1 | 92.1 | NR | NR | 92.1 |

It was observed that the modified samples (3B and 3D) exhibited lower haze and increased gloss with improved uniformity over the sheets formed from the unmodified samples (3A and 3C). Unexpectedly, the thin film (2 mil. sheets) experienced significant improvements in optical properties despite the rapid quenching utilized in cast films.

Two of the formed sheets were then evaluated for stretching performance by orienting the sheet to a 4×4 areal draw ratio. The results follow in Table 3B.

TABLE 3B

| Sample # | Stretch temp (° C.) | Preheat time (s) | Meas. Thickness (mils) | Centercut (g) | Calc. thick (mils) | Transmittance | Haze (%) | Clarity | Gloss |
|---|---|---|---|---|---|---|---|---|---|
| 3A | 115 | 30 | 0.70 | 0.1213 | 0.708 | 91.6 | 3.80 | 98.7 | 80.1 |
|  | 116 | 30 | 0.66 | 0.1234 | 0.720 | 91.5 | 4.76 | 98.5 | 72.1 |
|  | 117 | 30 | 0.67 | 0.1124 | 0.656 | 91.6 | 5.93 | 98.2 | 70.4 |
|  | 118 | 30 | 0.49 | 0.0883 | 0.515 | 91.5 | 17.3 | 96.1 | 50.6 |
|  | 119 | 30 | 0.39 | 0.0706 | 0.412 | 91.8 | 23.0 | 93.9 | 42.4 |
| 3B | 115 | 30 | 0.69 | 0.1381 | 0.806 | 91.6 | 2.13 | 99.5 | 90.7 |
|  | 116 | 30 | 0.68 | 0.1207 | 0.704 | 91.6 | 4.35 | 99.3 | 82.5 |
|  | 117 | 30 | 0.61 | 0.112 | 0.653 | 91.7 | 6.04 | 99.3 | 73.5 |
|  | 118 | 30 | 0.50 | 0.0912 | 0.532 | 91.7 | 12.8 | 98.6 | 47.8 |
|  | 119 | 30 | 0.43 | 0.082 | 0.478 | 91.7 | 19.2 | 98.1 | 34.7 |

*Thickness was measured with a TMI micrometer and calculated assuming a 0.934 g/cc density from an 85 × 85 m² punched from the center of the film.

It was observed that modification did not significantly increase stretching forces over the entire stretching temperature range tested. However, the modification did significantly lower the haze of the oriented film (with resultant improvements in gloss).

Example 4

Bottles were formed from varying polymer samples. Sample 4A was formed by M2710 (a metallocene formed polyethylene having a density of 0.927 g/cc and an $MI_2$ of 1.0 dg/min), commercially available from TOTAL PETROCHEMICALS, USA, Inc. Sample 4B was formed by melt blending 1000 ppm of HPN-20E with M270.

The samples were blow molded to form bottles, which were then evaluated for an improvement in properties, which follow in Table 4 below.

TABLE 4

| Sample | Haze (%) | Gloss@45° |
|---|---|---|
| 4A | 64 | 48 |
| 4B | 39 | 52 |

It was observed that modified sample (4B) formed bottles having significantly more transparency (as demonstrated by haze and gloss) with a haze value that decreased by 40% (similar to the blown films).

Example 5

Blown films were formed from varying polymer samples. Sample 5A was formed from M3410EP melt blended with 1000 ppm of HPN-20E. Sample 5B was formed from D350 (a metallocene formed polyethylene having a density of 0.933 g/cc and an $MI_2$ of 0.9 dg/min), commercially available from Chevron Phillips Chemicals, Inc. melt blended with 1000 ppm of HPN-20E. Sample 5C was formed from 6420 (a Ziegler-Natta formed polyethylene having a density of 0.962 g/cc and an $MI_2$ of 2.0 dg/min), commercially available from TOTAL PETROCHEMICALS, USA, Inc. melt blended with 1000 ppm of HPN-20E. Sample 5D was formed from L5885 (a Ziegler-Natta formed polyethylene having a density of 0.958 g/cc and an $MI_2$ of 0.85 dg/min), commercially available from Equistar Chemicals, Inc. melt blended with 1000 ppm of HPN-20E.

The samples were compounded and 2 mil. gauge blown films produced. The blown film properties were determined and are listed in Table 5 below.

TABLE 5

| Sample | Haze* | Gloss@45° | WVTR (g/in²/day) | OTR (cc/in²/day) |
|---|---|---|---|---|
| 5A | 30 | 27 | 40 | 37 |
| 5B | 16 | 6 | 28 | 38 |
| 5C | 21 | 61 | 27 | 40 |
| 5D | 12 | 19 | 21 | 29 |

*all nos. are percent improvement over unmodified sample

An unexpected improvement over similarly modified polyethylenes was observed. In particular, significant reductions in water vapor transmission rate were accomplished with Samples 5A and 5C in combination with haze and gloss improvements.

Example 6

Blown films were formed from varying polymer samples. Sample 6A was formed from M4707 (a metallocene formed polyethylene having a density of 0.947 g/cc and an MI$_2$ of 0.7 dg/min). Sample 6B was formed from M2710 (a metallocene formed polyethylene having a density of 0.927 g/cc and an MI$_2$ of 0.9 dg/min). Sample 6C was formed by melt blending Sample 6A with 5 wt. % of a masterbatch of HPN-20E. Sample 6D was formed by melt blending Sample 6B with 5 wt. % of a masterbatch of HPN-20E.

The samples were compounded and 2 mil. gauge blown films produced. The blown film properties were determined and are listed in Table 6 below.

TABLE 6

| Sample | WVTR (g/in$^2$/day) | OTR (cc/in$^2$/day) | COF |
|---|---|---|---|
| 6A | 0.254 | 111.1 | 0.05 |
| 6B | 0.475 | 191.0 | 0.20 |
| 6C | 0.125 | 51.8 | 0.16 |
| 6D | 0.340 | 134.6 | 0.27 |

A significant decrease in permeability was observed upon nucleation. In addition, an increase in the coefficient of friction (COF) was observed.

While the foregoing is directed to embodiments of the present invention, other and further embodiments of the invention may be devised without departing from the basic scope thereof and the scope thereof is determined by the claims that follow.

What is claimed is:

1. A process of forming a polymer article comprising:
providing an ethylene based polymer, wherein the ethylene based polymer exhibits a density of from about 0.920 g/cc to about 0.970 g/cc and wherein the ethylene based polymer is formed from a catalyst system selected from a metallocene catalyst comprising tetrahydroindenyl ligands and a Ziegler-Natta catalyst formed by contacting a magnesium dialkoxide compound with successively stronger chlorinating agents;
blending the ethylene based polymer with a modifier to foam modified polyethylene, wherein the modifier is a nucleator comprising zinc stearate and a cyclohexane dicarboxylic acid calcium salt; and
forming the modified polyethylene into a polymer article.

2. The process of claim 1, wherein the modified polyethylene comprises from about 50 ppm to about 3000 ppm modifier.

3. The process of claim 1, wherein the ethylene based polymer comprises at least about 90 wt. % polyethylene.

4. The process of claim 1, wherein the ethylene based polymer comprises at least about 98 wt. % polyethylene.

5. The process of claim 1, wherein the ethylene based polymer comprises a melt index (MI$_2$) of less than about 15 dg/min.

6. The process of claim 1, wherein the forming comprises solid state stretching.

7. The process of claim 1, wherein the forming comprises blowing the modified polyethylene into a film.

8. The process of claim 1, wherein the ethylene based polymer exhibits a density of from about 0.926 g/cc to about 0.940 g/cc.

9. The process of claim 1, wherein the ethylene based polymer exhibits a density of from about 0.940 g/cc to about 0.970 g/cc.

10. The process of claim 1, wherein the forming comprises casting the modified polyethylene into a film.

11. The process of claim 1, wherein the forming comprises blow molding the modified polyethylene into a blow molded article.

12. The process of claim 1, wherein the ethylene based polymer exhibits a molecular weight distribution of from about 1.5 to about 7.0.

13. A polymer article formed from the process of claim 1.

14. The polymer article of claim 13 comprising a blown.

15. The polymer article of claim 13 comprising a cast film.

16. The polymer article of claim 13 comprising a blow molded article.

17. The process of claim 1, wherein the polymer article exhibits a haze that is at least about 35% less than a polymer article formed by a substantially identical process and polymer absent the modifier.

18. The process of claim 1, wherein the polymer article exhibits a gloss that is at least about 50% higher than a polymer article formed by a substantially identical process and polymer absent the modifier.

19. The process of claim 1, wherein the polymer article exhibits a water vapor transmission rate that is at least about 20% less than a polymer article formed by a substantially identical process and polymer absent the modifier.

20. The process of claim 1 further comprising blending the modified polyethylene with a second ethylene based polymer.

* * * * *